Patented May 21, 1929.

1,713,887

UNITED STATES PATENT OFFICE.

ARTHUR J. BRIGGS, OF SYRACUSE, NEW YORK, ASSIGNOR TO ONONDAGA STEEL COMPANY, INC., A CORPORATION OF NEW YORK.

PRODUCTION OF WROUGHT IRON.

No Drawing.      Application filed December 8, 1926. Serial No. 153,459.

This invention relates to the manufacture of wrought iron, and has for an object to provide an improved process by which a substantial economy of time and labor is effected in the production of wrought iron, a further object being to avoid the relatively high heats which characterize the utilization of pig-iron in conventional puddling processes, together with the expense, difficulties of operation, and deterioration of plant incidental to said heats. Another object of the invention is to provide a process of making wrought iron, utilizing iron in a sponge state comprising discrete particles of substantially pure iron.

In the improved process, finely ground iron ore is mixed with carbonaceous material, as for example powdered bituminous coal, preferably in such proportions that a chemical balance exists under reduction conditions. This mixture is reduced at a temperature preferably just below the softening point of the gangue, say at about 1750° F., this operation being performed preferably in a rotary kiln, the product of which comprises a granular material containing discrete particles of metallic iron and other particles mixed therewith and containing silica and other impurities which represent the gangue of the ore.

The iron particles are then separated from the gangue particles, preferably by a mechanical process, for which purpose use may be made satisfactorily of well-known magnetic separation processes which can be carried out at normal temperatures and while the material is in a dry state, the iron aggregate thus separated being of the character known as sponge iron, of a highly refined nature, containing a high percentage of substantially pure iron, and still containing also a small percentage of the gangue not removed by the magnetic separation.

To convert this sponge iron into wrought iron it is mixed with slag materials suitable to produce the desired welded fibrous structure in subsequent stages of the process, the quantity of roll-scale and cinder in the mix being sufficient to re-act also on the silica remaining in the iron, and also on any metalloids that may remain in the sponge iron.

This mixture is then heated in a suitable furnace to a welding temperature, say to about 2500° F., which is above the melting point of the slag-forming materials, but below the melting-point of iron, and the mixture is worked in the furnace to form a ball which is then removed and worked to form wrought iron, as for example by being squeezed and rolled to from muck-bar.

Preferably the heating operation is effected in a rotary electric furnace from which the air is excluded in order to avoid oxidation of the finely divided iron, and for this purpose use may be made desirably of the rotary electric furnace disclosed in my co-pending application Ser. No. 103,629.

The improved process forming the subject of the present invention differs from the conventional process of puddling iron in that the iron is highly refined when it is put into the furnace, so that the time and relatively high degree of heat ordinarily required to eliminate metalloids from pig iron are avoided, the usual reactions for the removal of metalloids taking place to a very slight extent, and thus chemical reactions are practically eliminated.

The various operations involved in the herein disclosed improvements in production of wrought iron can, furthermore, be carried out almost entirely by mechanical means, inasmuch as the ore and coal can be readily ground by automatically operated grinding mechanism and delivered mechanically to the rotary kilns, which are capable of automatic operation, and their granular product can be easily separated by automatic means; while the sponge iron, composed of discrete particles of iron in a dry state, lends itself readily to admixture with the slag materials and also to charging into the rotary furnace and to uniform treatment therein to effect welding action by simple rotative action of the furnace.

The capital investment required for the various machinery and equipment employed is much less than that involved in the production of wrought iron from ore by first producing pig iron in the blast furnace and utilizing the pig iron for a puddling charge, as in existing methods of producing wrought iron, and these economies of investment and labor, coupled with the lower expenditure for fuel, and the lower cost of maintenance, result in a greatly reduced cost of production.

Wrought iron can thus be produced of a uniformly high quality, by reason of the uniformity with which the various steps may be performed, and for the same reason there will be but little iron loss, especially where use is made of the rotary electric furnace, which avoids losses by oxidation, and accordingly the wrought iron can be produced at a much lower cost than heretofore. The lowered cost of production also renders the genuine wrought iron thus produced available for uses in which its characteristic advantages of resistance to shock and freedom from corrosion are desirable, but for which uses the relatively high cost of puddled wrought iron heretofore has exercised a deterrent effect and has caused resort to such unsatisfactory expedients as the piling and rewelding of scrap for use as a substitute for true wrought iron.

I claim:

1. In the process of making wrought iron, the steps which comprise mixing discrete particles of iron with slag-forming materials in proper quantities to produce the desired fibrous structure in the iron, and heating the mixture to a welding temperature, in a rotary electric furnace from which air is excluded.

2. In the process of making wrought iron, the steps which comprise mixing sponge iron with slag-forming materials in proper quantities to produce the desired fibrous structure in the iron, and heating the mixture to a welding temperature, in a rotary electric furnace from which air is excluded.

3. In the process of making wrought iron from sponge iron, the steps which comprise mixing the sponge iron with slag-forming materials in proper quantities to produce the desired fibrous structure when the iron particles are subsequently welded together, and to re-act on the silica remaining in the sponge iron and on any metalloids remaining therein; then charging the mixture of sponge iron and slag-forming materials in a rotary electric furnace from which air is excluded to prevent oxidation of the iron, and heating the mixture to a temperature above the melting point of said slag-forming materials, but below that of said iron; rotating said furnace to weld said iron particles and form a ball; and removing said ball, and working the same, to form wrought iron.

In testimony whereof, I have signed this specification.

ARTHUR J. BRIGGS.